US010750753B2

(12) United States Patent
Finnsson

(10) Patent No.: US 10,750,753 B2
(45) Date of Patent: Aug. 25, 2020

(54) FLOWLINE SYSTEM AND A METHOD FOR PROCESSING FOOD PRODUCTS

(71) Applicant: MAREL ICELAND EHF, Gardabaer (IS)

(72) Inventor: Thorir Finnsson, Kopavogur (IS)

(73) Assignee: MAREL ICELAND EHF, Gardabaer (IS)

( * ) Notice: Subject to any disclaimer, the term of this patent is extended or adjusted under 35 U.S.C. 154(b) by 0 days.

(21) Appl. No.: 16/470,052

(22) PCT Filed: Dec. 15, 2017

(86) PCT No.: PCT/EP2017/083119
§ 371 (c)(1),
(2) Date: Jun. 14, 2019

(87) PCT Pub. No.: WO2018/109195
PCT Pub. Date: Jun. 21, 2018

(65) Prior Publication Data
US 2019/0357554 A1    Nov. 28, 2019

(30) Foreign Application Priority Data
Dec. 16, 2016    (DK) .................................. 2016 70998

(51) Int. Cl.
*A22C 25/00*    (2006.01)
*A22C 25/08*    (2006.01)
(Continued)

(52) U.S. Cl.
CPC .............. *A22C 25/08* (2013.01); *B65G 43/08* (2013.01); *B65G 47/50* (2013.01); *B65G 47/681* (2013.01);
(Continued)

(58) Field of Classification Search
CPC .......... A22C 25/00; A22C 25/04; A22C 25/12
(Continued)

(56) References Cited

U.S. PATENT DOCUMENTS 5,057,055 A * 10/1991 Michaud .............. A22C 11/008
                                                              452/182
5,273,484 A * 12/1993 Roger .................... A22C 25/00
                                                              426/513
(Continued)

FOREIGN PATENT DOCUMENTS

JP        2000255748 A     9/2000
WO        9846086 A1      10/1998
(Continued)

OTHER PUBLICATIONS

International Search Report for Application No. PCT/EP2017/083119, dated Feb. 16, 2018.
(Continued)

*Primary Examiner* — Richard T Price, Jr.
(74) *Attorney, Agent, or Firm* — Workman Nydegger

(57) ABSTRACT

A flowline system for processing food products includes a feeding conveyor is provided for conveying the food products to be processed, a plurality of workstations are arranged along the feeding conveyor, a diverter associated with each of the plurality of workstations for diverting food products from the feeding conveyor to the workstations, and a takeaway conveyor assembly. Each workstation comprises a release mechanism configured to receive a food product after being processed and to transfer the processed food product onto the takeaway conveyor assembly, and where a control unit is provided to allocate a slot length on the takeaway conveyor assembly in accordance to a length of the processed food product.

14 Claims, 3 Drawing Sheets

(51) Int. Cl.
  *B65G 43/08* (2006.01)
  *B65G 47/50* (2006.01)
  *B65G 47/68* (2006.01)
(52) U.S. Cl.
  CPC ............... *B65G 2201/0202* (2013.01); *B65G 2203/0233* (2013.01); *B65G 2203/0258* (2013.01)
(58) Field of Classification Search
  USPC .......................................... 452/177, 179–184
  See application file for complete search history.

(56) References Cited

U.S. PATENT DOCUMENTS

| | | | |
|---|---|---|---|
| 5,702,295 A * | 12/1997 | Ketels | ................... A22C 25/08 452/180 |
| 5,854,447 A | 12/1998 | Greenwood et al. | |
| 5,860,504 A | 1/1999 | Lazzarotti | |
| 7,467,996 B1 * | 12/2008 | Jager | ................... A22C 17/0093 452/177 |
| 2013/0299307 A1 | 11/2013 | Thorsson et al. | |

FOREIGN PATENT DOCUMENTS

| | | |
|---|---|---|
| WO | 2005105330 A2 | 11/2005 |
| WO | 2009102479 A2 | 8/2009 |
| WO | 2010125111 A1 | 11/2010 |

OTHER PUBLICATIONS

Danish Search Report for Application No. PA 2016 70998, dated Jun. 14, 2017.

* cited by examiner

FLOWLINE SYSTEM AND A METHOD FOR PROCESSING FOOD PRODUCTS

FIELD OF THE INVENTION

The present invention relates to a flowline system and a method for processing food products.

BACKGROUND OF THE INVENTION

Typical flowline systems that are used in the food industry comprise a conveyor and multiple of processing stations arranged along the conveyor where food products are processed. The processed food products are commonly released from the processing stations onto an underlying take-away conveyor that may feed the processed food products into any type of subsequent food processing equipment where subsequent processing steps take place. As an example, if the food products are fish fillets, such food processing equipment may be an X-ray apparatus comprising a cutting device, such as a high pressure water jet cutter, for cutting the fish fillets automatically around e.g. the pin bones and even into portions. Other examples for such subsequent food processing equipment could be a freezer for freezing the processed food products, or a portioning device for cutting the processed food products into portions.

Such a take-away conveyor reserves a fixed sloth length for the processed food, e.g. the fish fillets, typically such that it corresponds to at least the length of the largest fish so as to prevent the fish fillets from overlapping, which is obviously not acceptable when the take-away conveyor is configured to act as an infeed conveyor for the food processing equipment. This however has the drawback that if the processed food products varies much in length, there will be an empty space between the processed food products, e.g. the fish fillets, which affects the throughput of the processing at the food processing equipment.

SUMMARY OF THE INVENTION

On the above background it is an object of embodiments of the present invention to provide a flowline system that is suitable to be operated as an infeed conveyor for subsequent food processing equipment where the throughput may be increased.

In general, the invention preferably seeks to mitigate, alleviate or eliminate one or more of the above mentioned disadvantages of the prior art singly or in any combination. In particular, it may be seen as an object of embodiments of the present invention to provide a flowline system and a method that solves the above mentioned problems, or other problems.

To better address one or more of these concerns, in a first aspect of the invention a flowline system is provided for processing food products, comprising:
a feeding conveyor for conveying the food products to be processed,
a plurality of workstations arranged along the feeding conveyor,
a control unit,
a diverting means associated with each of the plurality of workstations for diverting food products from the feeding conveyor to the workstations, and
a takeaway conveyor assembly,
wherein each workstation comprises a release mechanism configured to receive a food product after being processed and to transfer the processed food product onto the takeaway conveyor assembly, and where the control unit is adapted to allocate a slot length on the takeaway conveyor assembly in accordance to a length of the processed food product.

Accordingly, the distance between adjacent processed food products received by the takeaway conveyor assembly will be reduced and preferably be minimized since now the slot length is adapted to the length of the individual processed food products, e.g. a 80 cm long processed fish fillet will be given more slot length than a 50 cm long processed fish fillet. This means that the throughput of one or more subsequent processing steps performed by another processing equipment, when the takeaway conveyor assembly is implemented as an infeed conveyor, will be increased. An example of such one or more subsequent processing steps is where the processed food product is e.g. transferred into a freezer apparatus, or to an automatic cutting and/or trimming machine, e.g. where the processed food product may be exposed by X-rays and where the resulting X-ray signals are processed and used as an operation parameter in operating a cutting tool, such as a high pressure water jet. Other subsequent processing steps could include cutting the processed food products on the takeaway conveyor assembly.

The term length of the processed food product may according to the present invention be understood as the length along a longitudinal axis of the processed food product meaning that if the food product is a fish fillet, it is the length of the fish fillet, and if the food product is loin of meat, it is the length of the loin.

Particularly, there is a plurality of workstations for each conveyor and the diverting means may form the interface between the common conveyor and the individual workstations. The control unit is adapted to allocate a slot length on the takeaway conveyor assembly in accordance to a length of the processed food product, i.e. the control unit allocates space on one common takeaway belt which joins products from a plurality of workstations—by this slot allocation, products from a plurality of workstations can be combined on one conveyor assembly with sufficient space between individual products.

In one embodiment, the takeaway conveyor assembly comprises a receiving conveyor arranged below the plurality of workstations, and where the step of allocating the slot length in accordance to a length of the processed food product comprises allocating such a slot length on the receiving conveyor. In another embodiment, the takeaway conveyor assembly comprises a receiving conveyor arranged below the plurality of workstations and a buffer conveyor arranged downstream to the receiving conveyor in an end-to-end arrangement, where the control unit is configured to utilize the length of the processed food product in operating the speed of the receiving conveyor and/or the buffer conveyor such that the slot length on the buffer conveyor is in line with the length of the processed food product.

In one embodiment, the release mechanism comprises a weighing unit configured to weigh the processed food product. In an embodiment, the weight of the processed food product is compared to a reference weights or weight distribution, and based thereon the length of the processed food product is obtained. Accordingly, a simple solution is provided for utilizing the weighing data in obtaining a length or length estimate of the processed food product. This may as an example be performed by performing a calibration measurements where a particular type of food product, e.g. cod fillets, are weighed and where the weight is linked to the length of the fish fillets. Thus, a weight vs. length distribution is obtained. This may also be a process where e.g. the first x number of food products are to start with assigned with a fixed sloth length, sufficiently large, and where the length of the food products (e.g. the cod fillets) are in the subsequent processing step determined and linked to the weight. The resulting distribution may then be utilized in acquiring the weight or weight estimate of the processed food product. As an example, said automatic cutting and/or trimming machine may determine the length of the food products, and where after a sufficiently accurate distribution is obtained, that fixed slot length "process" is replaced with a "dynamic process" where the slot length selection is based on the length or length estimates of the food products.

In one embodiment, the release mechanism comprises side by side arranged carrying members having length at least equaling the length of the processed food product and configured to receive the food product such that a longitudinal axis of the food product is essentially parallel to a longitudinal axis of the carrying members, and where the control unit is further configured to operate the releasing of the processed food product by means of simultaneously opening the carrying members at their adjacent sides, causing the processed food product to fall there through while maintaining the initial shape on the carrying members. It is thus ensured that the processed food product will remain its initial shape on the release mechanism and thus be optimally located/positioned for the one or more processing step which may e.g. include cutting the food product into portions. In such instances, it is obviously important that the food product is lying smoothly on the takeaway conveyor assembly, instead of being wrinkled that would require a manual intervene to un-wrinkle and reposition it and thus prepare it for the at least one subsequent processing step.

In one embodiment, the release mechanism comprises a reference line configured to indicate where one end of the processed food product is to be situated. In that way, it is ensured that the processed food product always has a fixed reference point before it is transferred to the takeaway conveyor assembly meaning that the assigned slot length will be optimized.

In one embodiment, the system further comprises at least one imaging device for capturing image data of the processed food product and a processor configured to process the image data so as to determine the position of the processed food product on the release mechanism and the length of the processed food product. Thus an accurate solution is provided to determine the length of the food product. Moreover, there is no need for a reference. The imaging device may e.g. comprise any type of digital camera.

In one embodiment, the system further comprises a quality inspection station including at least one quality inspection device for determining the quality of the processed food product, and a tracking device for tracking the processed food product to the workstation where the food product was processed. The quality inspection device may comprise one or more of the following: an X-ray apparatus, digital camera, line camera and the like, where the acquired image data is processed by a processor and utilized to evaluate the quality of the processing. If the quality is considered not to be acceptable, the tracking device is capable of identifying at what processing station the food product was processed. The tracking device may e.g. comprise a computer device that may evaluate, based on a) the time when the processed food product was released from the processing station (that step may trigger a signal), and b) when the released processed food product arrived at the quality inspection station, that this must be one and the same food product.

Other tracking devices may of course also be implemented, e.g. devices that may comprise a digital camera that observes all the released food products and when they arrive at the quality inspection station.

In one embodiment, the flowline system further comprises at least one buffer device arranged below the release mechanism for temporarily receiving the processed food product from the release mechanism and store it until a suitable slot on the takeaway conveyor assembly has been allocated, followed by releasing the processed food product from the at least one buffer device and into the allocated slot. Accordingly, the time it may take to allocate the suitable slot length will not affect the throughput from an operator at the processing station, e.g. in case of a scenario where the operator has already processed a given food product that has not yet been released on the takeaway conveyor assembly. Instead, the at least one buffer device may temporarily preserve the processed food product while the operator is processing the subsequent food product. Even two or more buffer devices may be provided below each other where the upmost buffer device may release the processed food product onto the underlying buffer device. The release mechanism may, as already addressed, comprise two carrying members that are placed parallel to each other and are rotatable round elongated rotation axes via an appropriate moving mechanism such that when being in a closing position, they define a smooth surface, and when being in an open position, there is a gap there between the allows the processed food product to fall down, preferably in a way such that its initial position is preserved. The at least one buffer device may be similarly designed as the release mechanism.

In a second aspect, the present invention relates to a method of processing food products, comprising:

conveying, by a feeding conveyor, the food products to be processed, diverting a food product from the feeding conveyor to a workstation selected from a plurality of workstations arranged along the feeding conveyor, wherein the method further comprises:

processing the food product at the workstation, placing the processed food onto a release mechanism, and allocating a slot length on a takeaway conveyor assembly in accordance to a length of the processed food product.

Accordingly, a method is provided that is capable of arranging the processed or pre-processed food products such that their arrangement is adapted to one or more subsequent processing steps, e.g. keep pre-defined distance between adjacent processed food products.

In one embodiment, the method further comprises transferring the processed food product from the release mechanism onto a takeaway conveyor assembly such that the shape of the processed food product is preserved. In that way, it is ensured that the processed food product is optimally positioned and preserved for the one or more subsequent processing steps.

In one embodiment, the takeaway conveyor assembly comprises a receiving conveyor arranged below the plurality of workstations, and where the step of allocating the slot length in accordance to a length of the processed food product comprises allocating such a slot length on the receiving conveyor. This receiving conveyor may e.g. be positioned such that it's free end acts as an infeed for another food processing equipment which may comprise a conveyor arranged in an end-to-an-end arrangement with the receiving conveyor, and where the dynamic allocation of the slot length maximizes the infeed from the receiving conveyor and into the food processing equipment.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
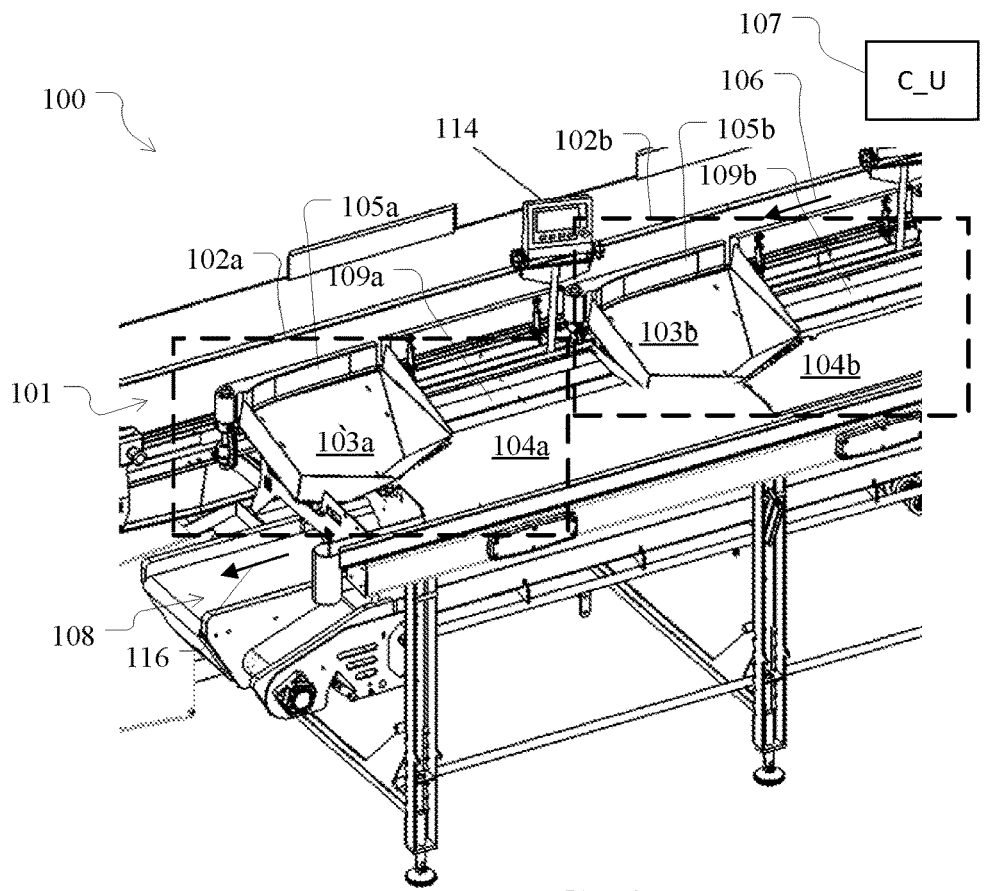
FIGS. 1 and 2 depict a perspective view and a top view of an embodiment of a flowline system according to the present invention for processing food products.
Figure 2:
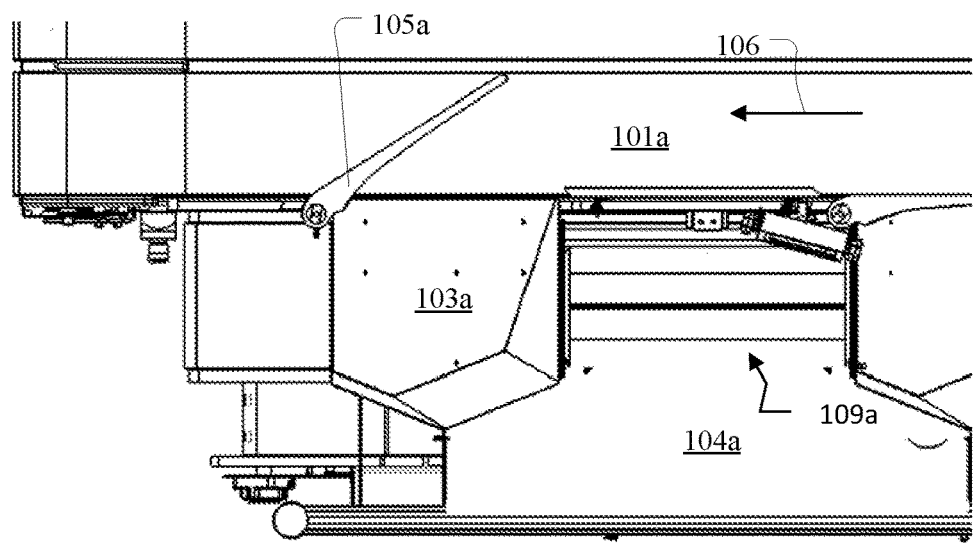

FIGS. 1 and 2 depict a perspective view and a top view of an embodiment of a flowline system 100 according to the present invention for processing food products, e.g. fish fillets or any other type of food products.

The flowline system 100 comprises a feeding conveyor 101 for conveying the food products to be processed in a direction as indicated by arrow 106 and a plurality of workstations 102*a,b* arranged along the feeding conveyor 101.

Each of the plurality of workstations 102*a.b* comprises a diverting means or as shown here sweep arms 105*a,b* for diverting food products from the feeding conveyor 101 to the workstations, receiving areas 103*a,b* where the unprocessed food products are accumulated together, processing tables 104*a,b* where the food products are processed by an operator (not shown), and a release mechanism 109*a,b* configured to among other things to receive a food product after being processed.

The flowline system 100 further comprises a control unit 107 that is among other things configured to operate the diverting means in diverting the food products from the feeding conveyor 101 to the workstations 102*a,b*. This may e.g. be based on which of the workstations lack food products to be processed and which do not lack food products.

The flowline system 100 further comprises a takeaway conveyor assembly, which, as shown in this embodiment, comprises a receiving conveyor 108 arranged below the plurality of workstations 102*a,b*, where the receiving conveyor 108 is configured to receive processed food products from the release mechanism 109*a,b*.

The control unit 107 is further configured to allocate a slot length on the receiving conveyor 108 in accordance to a length of the processed food product, where the receiving conveyor 108 conveys the received, processed food products in a direction as indicated by arrow 116. This means that if e.g. the food products are fish fillets having variable length, e.g. from 40 cm-80 cm, the slot length is allocated accordingly. As an example, a processed fish fillet of 40 cm may be allocated a slot length of 40 cm plus 5 cm on the opposite sides, i.e. 50 cm, and a processed fish fillet of 80 cm may be allocated a slot length of 90 cm. The term length shall preferably be understood as the length along the longitudinal axis of the processed food products.

The release mechanism 109, which will be discussed in more details in relation to FIGS. 3-5, comprises a weighing unit configured to weigh the processed food product. This weighing information may, as an example, be utilized to measure the yield of the processing, where the food products may be weighed before the processing and after the processing at the release mechanism. Also, in a preferred embodiment, the weight of the processed food product may be used as an input in estimating the length of the processed food product by e.g. means of comparing the weight with a reference distribution linking the weight of the processed food product to the length.

Figure 3:
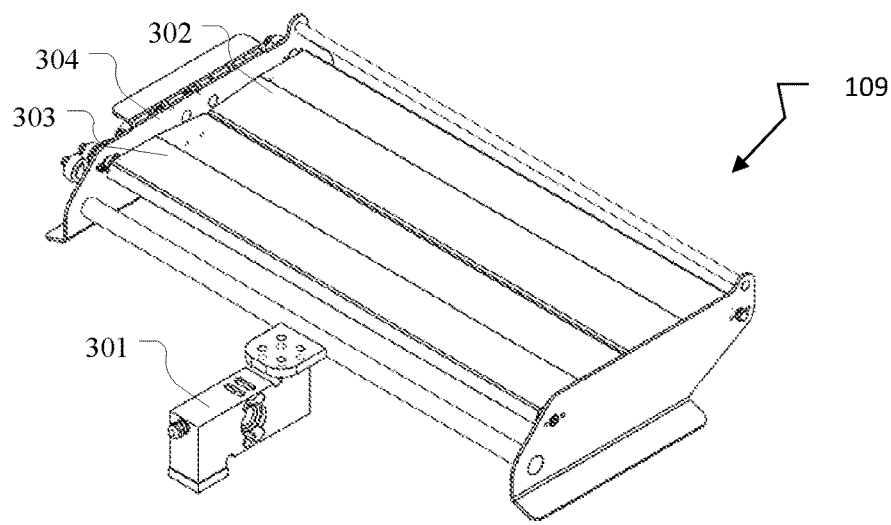
FIGS. 3 to 5 depict one embodiment of a release mechanism to be used in relation to the flowline system shown in FIGS. 1 and 2, FIGS. 6 and 7 depict graphically one way of implementing the invention.
Figure 4:
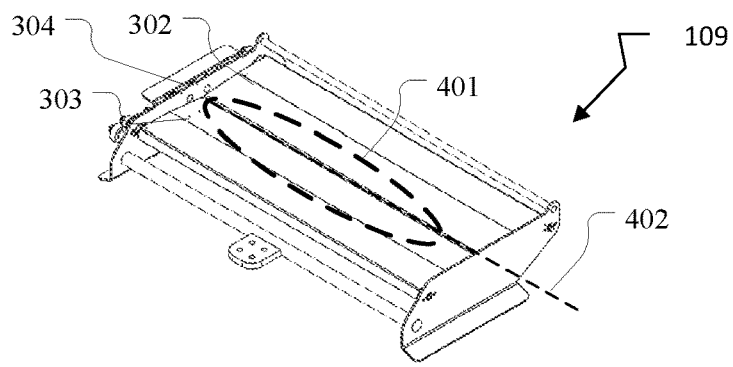
Figure 5:
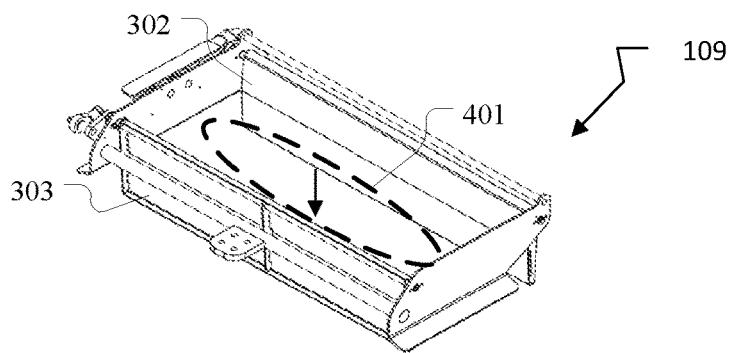

FIGS. 3 to 5 show the release mechanism 109 discussed in relation to FIGS. 1 and 2, where FIG. 3 shows the release mechanism 109 comprising said weighing unit 301, and two side by side arranged carrying members 302, 303 having length at least equaling the length of the processed food product, i.e. at least equaling the length of the longest food product to be processed. One of the opposite sides of the release mechanism 109 may further be configured to act as a reference line, e.g. side 304, so as to ensure that the reference position of the processed food product is always the same. This may be crucial when allocating the slot length for the processed food products to ensure their initial position at the release mechanism 109 is always the same, e.g. if the processed food product is only two third of the length of the release mechanism 109 it must be positioned at the correct reference position, i.e. at said reference line.

In another embodiment, this may be solved by using a camera position above e.g. each workstation where the image data indicate clearly the position of the food product, i.e. no reference position is needed, and an accurate length of the processed food product.

The side by side arranged carrying members 302, 303 are connected to an opening and closing mechanism (not shown) that is operated by the control unit 107 for opening and closing the adjacent sides of the carrying members 302, 303, when the processed food product has been assigned a slot on the receiving conveyor 108.

FIG. 4 shows as an example where a processed food product 401 has been placed onto the release mechanism 109 with one end of it facing said reference line 304, and such that the longitudinal axis of the food product is substantially parallel to the longitudinal axis 402 of the release mechanism 109.

FIG. 5 depicts an example where, in response to a control signal issued by the control unit 107, the adjacent sides carrying members 302, 303 open downward simultaneously causing the processed food product to fall down and into the slot that has been assigned to this particular processed food product such that its length fits optimally into the slot.

More importantly, due to the design of the release mechanism 109 it is ensured that when the processed food product drops into said assigned slot length, it preserves the initial shape as shown in FIG. 4.

Figure 6:
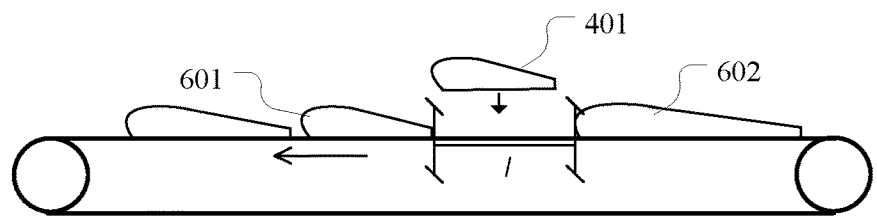
Figure 7:
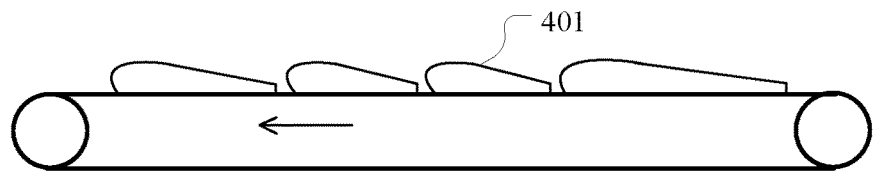

FIGS. 6 and 7 depict graphically one way of implementing the invention, where e.g. the food product shown in FIG. 5 falls down towards the receiving conveyor 108 (see FIG. 1), and where the slot length l shown in FIG. 6 has been allocated for this particular processed food product 401, such that it fits in the most optimal way in the stream of processed food items 601, 602 as shown in FIG. 7.

The processed, or pre-processed food products shown in FIG. 7 may form an infeed stream of food products for a subsequent processing steps (e.g. freezing process), where, due to the elimination of the space between adjacent food products, the throughput may be increased.

Figure 8:
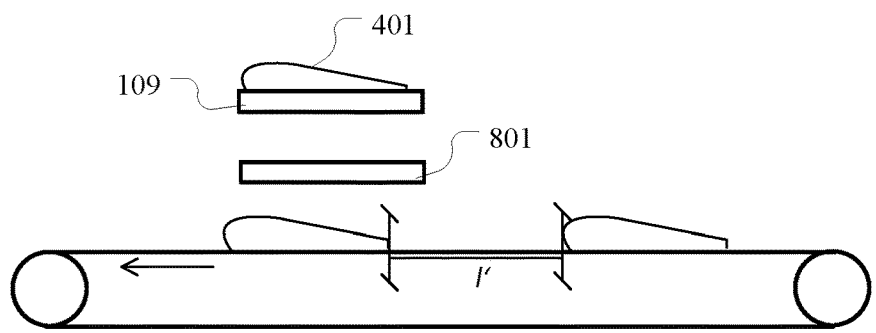
FIGS. 8 to 10 depict another embodiment of the system.
Figure 9:
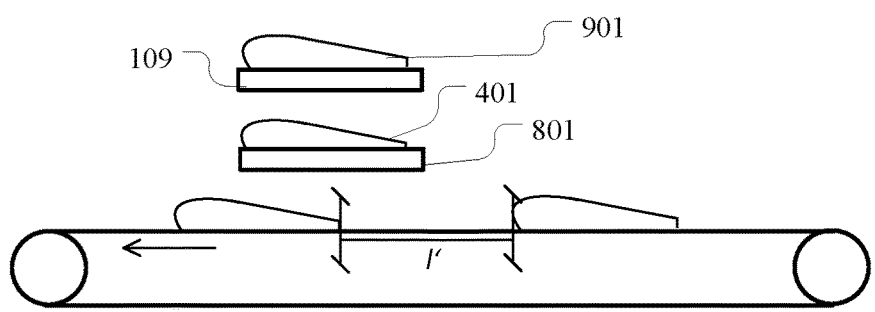
Figure 10:
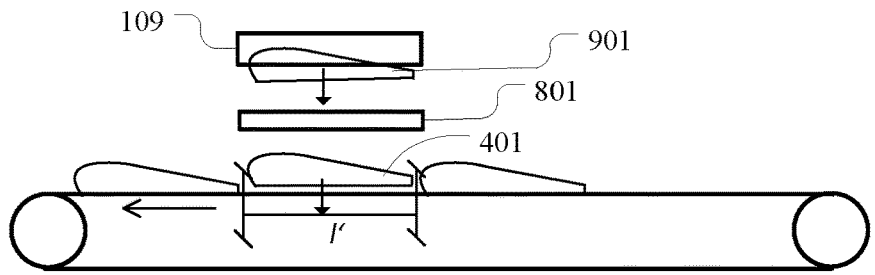

FIGS. 8 to 10 depict another embodiment of the system shown in relation to FIGS. 1 to 7, where, in this embodiment, the flowline system further comprises at least one buffer device 801 arranged below the release mechanism 901 for temporarily receiving the processed food product from the release mechanism and for storing it until a suitable slot on the takeaway conveyor assembly has been allocated. The at least one buffer device 801, which, as shown here, is a single buffer device, may be designed similarly to the release mechanism as shown in FIGS. 4 and 5.

FIG. 8 depicts the step where a suitable slot l' has been detected for e.g. said fish fillet 401 that has recently been processed by an operator (not shown). As shown here, the slot l' is however not yet below the release mechanism 109. Both the release mechanism 109 and the buffer device 801 are shown here in a closing position.

FIG. 9 shows where the processed fish fillet 401 has been released from the release mechanism 109 (e.g. as shown in FIG. 5), shown here in a closing position, and onto the buffer device 801 that is positioned below the release mechanism 109. The buffer device 801 is shown here in a closing position and stores the processed fish fillet 401 until the slot length l' is below the buffer device 801. During this time, the operator has processed another fish fillet (food product) and placed it onto the release mechanism 109.

FIG. 10 shows the scenario where the processed fish fillet 401 has been released from the buffer device 801 and is entering slot l'. The buffer device has moved back to a closing position. The fish fillet 901 is shown here being released from the releasing mechanism 109, shown here in an open position, and into the buffer device 801.

This cycle is then repeated for the subsequent fish fillets (food products).

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A flowline system for processing food products, comprising:
    a feeding conveyor for conveying the food products to be processed,
    a plurality of workstations arranged along the feeding conveyor,
    a control unit,
    a diverter associated with each of the plurality of workstations for diverting food products from the feeding conveyor to the workstations, and
    a takeaway conveyor assembly,
    wherein each workstation comprises a release mechanism configured to receive a food product after being processed and to transfer the processed food product onto the takeaway conveyor assembly, and where the control unit is adapted to allocate a slot length on the takeaway conveyor assembly in accordance to a length of the processed food product.

2. The flowline system according to claim 1, wherein the takeaway conveyor assembly comprises a receiving conveyor arranged below the plurality of workstations, and where the step of allocating the slot length in accordance to a length of the processed food product comprises allocating such a slot length on the receiving conveyor.

3. The flowline system according to claim 1, wherein the takeaway conveyor assembly comprises a receiving conveyor arranged below the plurality of workstations and a buffer conveyor arranged downstream to the receiving conveyor in an end-to-end arrangement, where the control unit is configured to utilize the length of the processed food product in operating the speed of the receiving conveyor and/or the buffer conveyor such that the slot length on the buffer conveyor is in line with the length of the processed food product.

4. The flowline system according to claim 1, wherein the release mechanism comprises side by side arranged carrying members each having a length at least equaling the length of the processed food product and configured to receive the food product such that a longitudinal axis of the food product is essentially parallel to a longitudinal axis of the carrying members, and where the control unit is further configured to operate the releasing of the processed food product by simultaneous opening of the carrying members at their adjacent sides, causing the processed food product to fall there through.

5. The flowline system according to claim 1, wherein the release mechanism comprising a weighing unit configured to weigh the processed food product.

6. The flowline system according to claim 5, wherein the weight of the processed food product is compared to a reference weights or weight distribution, and based thereon, the length of the processed food product is obtained.

7. The flowline system according to claim 1, wherein the release mechanism comprises a reference line configured to indicate where one end of the processed food product is to be situated.

8. The flowline system according to claim 1, further comprising at least one imaging device for capturing image data of the processed food product and a processor configured to process the image data so as to determine the length of the processed food product.

9. A method of processing food products, comprising:
    conveying, by a feeding conveyor, the food products to be processed,
    diverting a food product from the feeding conveyor to a workstation selected from a plurality of workstations arranged along the feeding conveyor,
    wherein the method further comprises:
    processing the food product at the workstation,
    placing the processed food onto a release mechanism, and
    allocating a slot length on a takeaway conveyor assembly in accordance to a length of the processed food product.

10. The flowline system according to claim 1, further comprising:
    a quality inspection station including at least one quality inspection device for determining the quality of the processed food product, and
    a tracking device for tracking the processed food product to the workstation where the food product was processed.

11. The flowline system according to claim 1, further comprising at least one buffer device arranged below the release mechanism for temporarily receive the processed food product from the release mechanism and store it until a suitable slot on the takeaway conveyor assembly has been allocated, followed by releasing the processed food product from the at least one buffer device and into the allocated slot.

12. The method according to claim 9, further comprising transferring the processed food product from the release mechanism onto a takeaway conveyor assembly such that the shape of the processed food product is preserved.

13. The method according to claim 12, wherein the takeaway conveyor assembly comprises a receiving conveyor arranged below the plurality of workstations, and where the step of allocating the slot length in accordance to a length of the processed food product comprises allocating such a slot length on the receiving conveyor.

14. The method according to claim 12, wherein the release mechanism comprises a weighing unit configured to weigh the processed food product, and where the weight of the processed food product is compared to a reference weight or weight distribution, and based thereon the length of the processed food product is obtained.

* * * * *